US011244682B2

(12) United States Patent
Nakagawa et al.

(10) Patent No.: US 11,244,682 B2
(45) Date of Patent: Feb. 8, 2022

(54) INFORMATION PROCESSING DEVICE AND INFORMATION PROCESSING METHOD

(71) Applicant: SONY CORPORATION, Tokyo (JP)

(72) Inventors: Ayumi Nakagawa, Kanagawa (JP); Takanobu Omata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 88 days.

(21) Appl. No.: 16/631,889

(22) PCT Filed: Apr. 23, 2018

(86) PCT No.: PCT/JP2018/016400
§ 371 (c)(1),
(2) Date: Jan. 17, 2020

(87) PCT Pub. No.: WO2019/021553
PCT Pub. Date: Jan. 31, 2019

(65) Prior Publication Data
US 2020/0143813 A1   May 7, 2020

(30) Foreign Application Priority Data

Jul. 26, 2017   (JP) .............................. JP2017-144362

(51) Int. Cl.
*G10L 15/22*       (2006.01)
*G06F 3/16*        (2006.01)
*G10L 13/00*       (2006.01)

(52) U.S. Cl.
CPC ............ *G10L 15/222* (2013.01); *G06F 3/167* (2013.01); *G10L 13/00* (2013.01); *G10L 2015/223* (2013.01)

(58) Field of Classification Search
CPC ....... G10L 15/222; G10L 25/57; G10L 13/00; G06F 3/16
(Continued)

(56) References Cited

U.S. PATENT DOCUMENTS 7,412,389 B2 *   8/2008   Yang ...................... G06T 13/80
                                                    345/473
7,743,340 B2 *   6/2010   Horvitz ................ G05B 19/404
                                                    715/808
(Continued)

FOREIGN PATENT DOCUMENTS

CN       103999075 A     8/2014
CN       104661078 A     5/2015
(Continued)

OTHER PUBLICATIONS

Extended European Search Report of EP Application No. 18839071.0, dated Aug. 10, 2020, 08 pages.
(Continued)

*Primary Examiner* — Susan I McFadden
(74) *Attorney, Agent, or Firm* — Chip Law Group

(57) ABSTRACT

An information processing device is provided. The information processing device includes an output control unit that controls output of a spoken utterance related to information presentation. The output control unit outputs the spoken utterance, and visually displays an output position of an important part of the spoken utterance. In addition, an information processing method is provided. The information processing method includes controlling, by a processor, output of a spoken utterance related to information presentation. The controlling further includes outputting the spoken utterance and visually displaying an output position of an important part of the spoken utterance.

20 Claims, 15 Drawing Sheets

(58) Field of Classification Search
USPC .......................................................... 704/251
See application file for complete search history.

(56) References Cited

U.S. PATENT DOCUMENTS

| | | |
|---|---|---|
| 8,842,085 B1 | 9/2014 | Goodspeed et al. |
| 9,128,581 B1 | 9/2015 | Goodspeed et al. |
| 9,449,526 B1 | 9/2016 | Tseng et al. |
| 9,471,547 B1 | 10/2016 | Goodspeed et al. |
| 9,613,003 B1 | 4/2017 | Goodspeed et al. |
| 9,639,518 B1 | 5/2017 | Goodspeed et al. |
| 10,489,449 B2 * | 11/2019 | Barnes, Jr. ............ G06F 40/169 |
| 11,120,797 B2 * | 9/2021 | Saito ....................... G10L 15/22 |
| 2005/0033582 A1 * | 2/2005 | Gadd ..................... G06Q 30/02 704/277 |
| 2012/0095983 A1 | 4/2012 | Lee et al. |
| 2012/0197645 A1 | 8/2012 | Nakamae |
| 2013/0080881 A1 | 3/2013 | Goodspeed et al. |
| 2013/0311187 A1 | 11/2013 | Nakamae |
| 2014/0051042 A1 | 2/2014 | Mori et al. |
| 2015/0139606 A1 | 5/2015 | Lee |
| 2019/0108897 A1 * | 4/2019 | Cho ........................ G06F 16/53 |

FOREIGN PATENT DOCUMENTS

| | | |
|---|---|---|
| EP | 2442243 A1 | 4/2012 |
| EP | 2758894 A1 | 7/2014 |
| EP | 2874404 A1 | 5/2015 |
| JP | 2012-159683 A | 8/2012 |
| JP | 2014-038209 A | 2/2014 |
| JP | 2014-531671 A | 11/2014 |
| JP | 5634455 B2 | 12/2014 |
| KR | 10-2012-0039921 A | 4/2012 |
| KR | 10-2015-0056394 A | 5/2015 |
| WO | 2013/044071 A1 | 3/2013 |

OTHER PUBLICATIONS

International Search Report and Written Opinion of PCT Application No. PCT/JP2018/016400, dated Jul. 3, 2018, 10 pages of ISRWO.

Takemura, et al., "Ambient Interface, It's Goal and Strategies for the Realization", Journal of Human Interface Society: human interface, vol. 11, No. 4, Nov. 25, 2009, pp. 15-20.

* cited by examiner

FIG.5
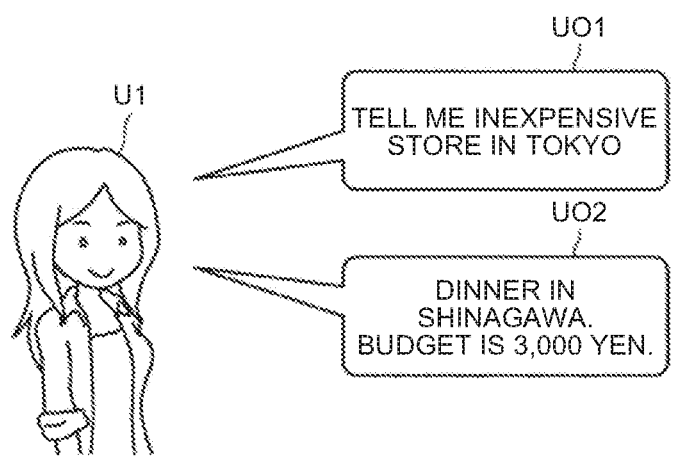
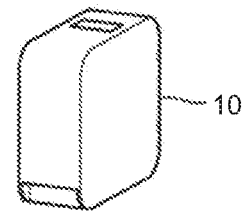

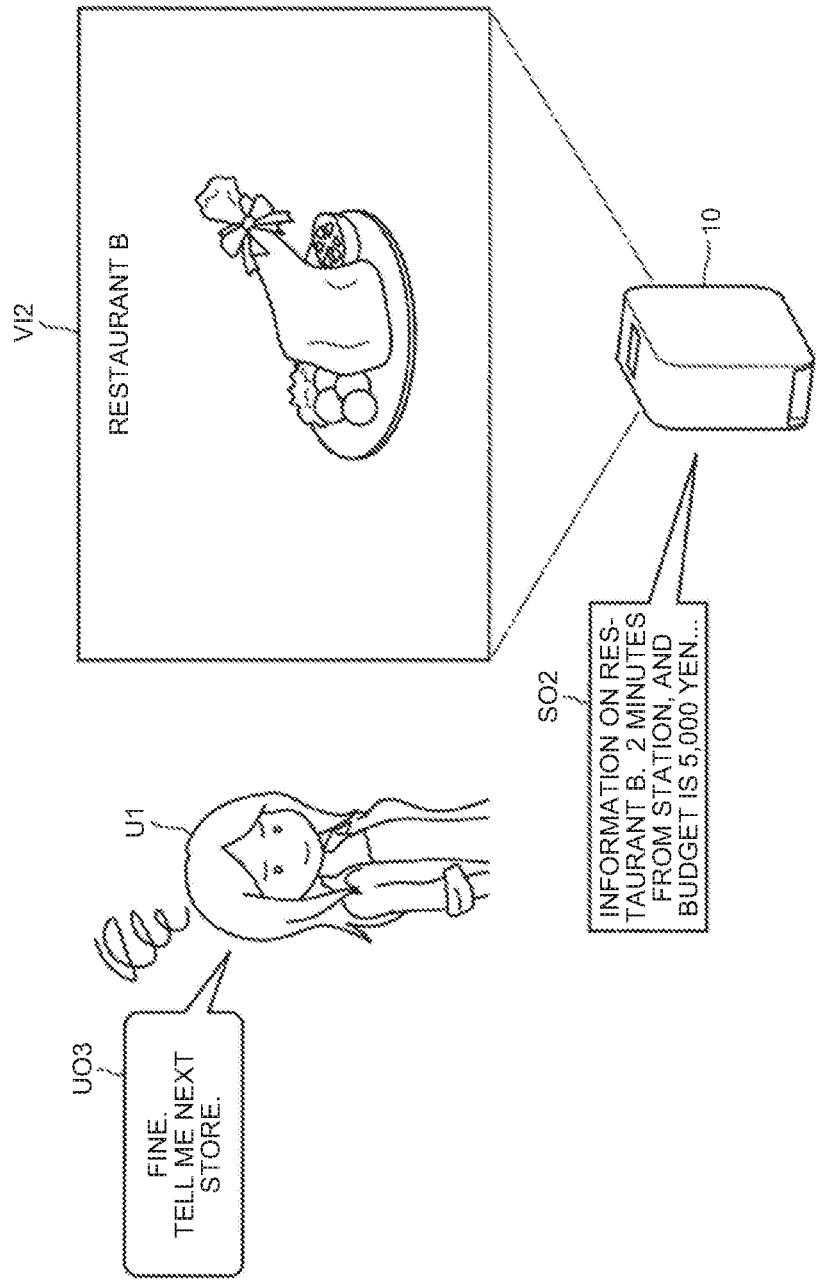

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/016400 filed on Apr. 23, 2018, which claims priority benefit of Japanese Patent Application No. JP 2017-144362 filed in the Japan Patent Office on Jul. 26, 2017. Each of the above-referenced applications is hereby incorporated herein by reference in its entirety.

FIELD

The present disclosure relates to an information processing device, an information processing method, and a computer program.

BACKGROUND

In recent years, various kinds of devices for presenting information to users by using voice have become widespread. Regarding information presentation by voice, many technologies for enhancing convenience for users have been developed. For example, Patent Literature 1 discloses a voice synthesis device for displaying an utterance time related to synthesized voice.

CITATION LIST

Patent Literature

Patent Literature 1: Japanese Utility Model Application Laid-open No. S60-3898

SUMMARY

Technical Problem

The voice synthesis device disclosed in Patent Literature 1 enables a user to grasp the length of output voice. However, it is difficult for the technology disclosed in Patent Literature 1 to cause the user to perceive when voice corresponding to information desired by the user is output.

Thus, the present disclosure proposes a novel and improved information processing device, information processing method, and computer program capable of causing a user to perceive an output position of an important part in information presentation by a spoken utterance.

Solution to Problem

According to the present disclosure, an information processing device is provided that includes an output control unit that controls output of a spoken utterance related to information presentation, wherein the output control unit outputs the spoken utterance, and visually displays an output position of an important part of the spoken utterance.

Moreover, according to the present disclosure, an information processing method is provided that includes controlling, by a processor, output of a spoken utterance related to information presentation, wherein the controlling further includes outputting the spoken utterance and visually displaying an output position of an important part of the spoken utterance.

Moreover, according to the present disclosure, a computer program is provided that causes a computer to function as an information processing device comprising an output control unit that controls output of a spoken utterance related to information presentation, wherein the output control unit outputs the spoken utterance, and visually displays an output position of an important part of the spoken utterance.

Advantageous Effects of Invention

As described above, the present disclosure enables a user to perceive an output position of an important part in information presentation by a spoken utterance.

The above-mentioned effect is not necessarily limited, and any effect described herein or other effects that could be understood from the specification may be exhibited together with or in place of the above-mentioned effect.

BRIEF DESCRIPTION OF DRAWINGS

FIG. 5 is a diagram for describing generation of an individual model based on an inquiry utterance according to the embodiment.

FIG. 6A is a diagram for describing generation of an individual model based on a response utterance of a user according to the embodiment.

DESCRIPTION OF EMBODIMENTS

Referring to the accompanying drawings, exemplary embodiments of the present disclosure are described in detail below. In the specification and the drawings, components having substantially the same functional configurations are denoted by the same reference symbols to omit overlapping descriptions.

The descriptions are given in the following order:
1. Embodiment
   1.1. Outline of embodiment
   1.2. System configuration example
   1.3. Functional configuration example of information processing terminal 10
   1.4. Functional configuration example of information processing server 20
   1.5. Details of model construction and output control
   1.6. Output control corresponding to users
   1.7. Flow of processing
2. Hardware configuration example
3. Conclusion

1. EMBODIMENT

1.1. Outline of Embodiment

First, the outline of one embodiment of the present disclosure is described. As described above, in recent years, various devices for presenting information to users by spoken utterances have become widespread. For example, the devices as described above can present an answer to an inquiry made by an utterance of a user to the user by using voice or visual information.

The devices as described above can transmit various kinds of information to users in addition to answers to inquiries. For example, the devices as described above may present recommendation information corresponding to learned preferences of users to the users by spoken utterances and visual information.

In general, however, it is difficult for users to grasp when important information is output in the information presentation by spoken utterances. Thus, the users need to listen to spoken utterances until desired information is output, and are required to have high power of concentration.

Even when a user listens to spoken utterances until the last, the case where information desired by the user is not output is assumed. In this case, the time of the user is unnecessarily consumed, which may be a cause to reduce the convenience.

The technical concept according to the present disclosure has been conceived by focusing on the above-mentioned matter, and enables a user to perceive an output position of an important part in information presentation by spoken utterances. Thus, one feature of an information processing device, an information processing method, and a computer program according to one embodiment of the present disclosure is to output a spoken utterance and visually display an output position of an important part of the spoken utterance.

Figure 1:
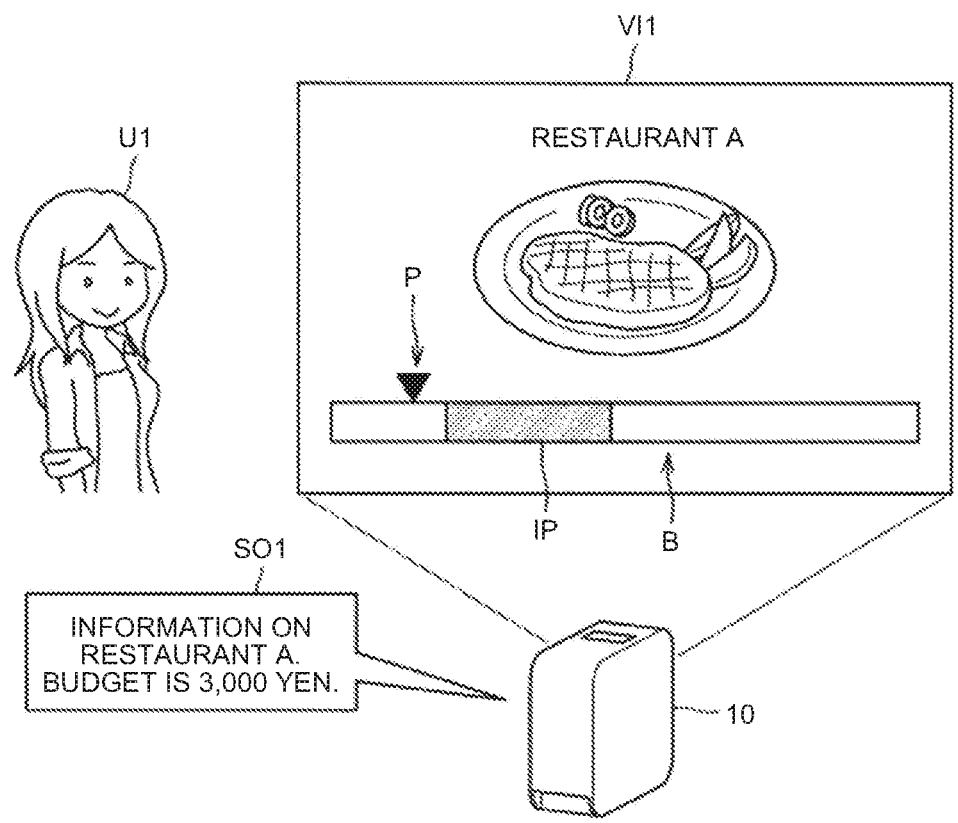
FIG. 1 is a diagram for describing the outline of one embodiment of the present disclosure.

FIG. 1 is a diagram for describing the outline of one embodiment of the present disclosure. FIG. 1 illustrates an example where an information processing terminal 10 presents restaurant information to a user U1 by using a spoken utterance SO1 and visual information VI1. The information processing terminal 10 may execute the above-mentioned processing based on control by an information processing server 20 described later. For example, the information processing server 20 according to one embodiment of the present disclosure can output information on a restaurant A to the information processing terminal 10 as an answer to an inquiry from the user U1.

In this case, as illustrated in FIG. 1, the information processing server 20 according to the present embodiment may output an output position of an important part of the spoken utterance to the information processing terminal 10 as the visual information VI1. More specifically, the information processing server 20 according to the present embodiment outputs the visual information VI1 including a bar B indicating the entire output length of the spoken utterance SO1 and a pointer P indicating the current position of the output of the spoken utterance SO1 to the information processing terminal 10. In other words, the pointer P is information indicating progress of the output of the spoken utterance SO1. By visually recognizing the bar B and the pointer P, the user U1 can grasp the degree of progress of the output of the spoken utterance SO1.

Furthermore, as illustrated in FIG. 1, the information processing server 20 according to the present embodiment can display an output position of the important part IP of the spoken utterance SO1 on the bar B. The above-mentioned important part IP may be a section including information that is estimated to have a higher priority for a user in the spoken utterance.

Examples of information presentation related to the restaurant A include various kinds of information such as the location, budget, atmosphere, and words of mouth related to the restaurant A. In this case, in the above-mentioned information presentation, the information processing server 20 according to the present embodiment estimates information having a higher priority for the user U1, and sets a section including information having the high priority in a spoken utterance corresponding to the information presentation as an important part IP. The information processing server 20 can display an output position of the set important part IP on the bar B.

In one example illustrated in FIG. 1, the information processing server 20 sets a section including money information that is estimated to have a higher priority for the user U1 as an important part IP, and sets sections including information having priority that is lower than the money information, such as the location and atmosphere, as non-important parts. The information processing server 20 controls the information processing terminal 10 to output a spoken utterance including the important part IP and the non-important parts, and displays an output position of the important part IP of the spoken utterance.

The information processing server 20 according to the present embodiment can set the priority and the important part based on preferences, characteristics, and attributes of users. For example, the information processing server 20 may calculate the priority for each category of presented information based on preferences, characteristics, and attributes of users, and set a section including information having priority that is equal to or higher than a threshold as an important part. The information processing server 20 may set a section including information having a higher priority in presented information as an important part.

The information processing server 20 can set a plurality of important parts. For example, when the priorities of money information and word-of-mouth information are high in the information presentation related to the restaurant A, the information processing server 20 may set section including the money information and the word-of-mouth information in the spoken utterance as important parts.

In this manner, the information processing server 20 according to the present embodiment enables the user U1 to visually recognize an output position of the important part IP of the spoken utterance SO1. Consequently, the user U1 can moderately pretend to listen to the spoken utterance SO1 until the important part IP is output, and perform operation input such as stop processing and a barge-in utterance on the spoken utterance SO1 after the important part IP is output, thereby more effectively using time. The above-mentioned functions of the information processing server 20 according to the present embodiment are described in detail below.

1.2. System Configuration Example

Figure 2:
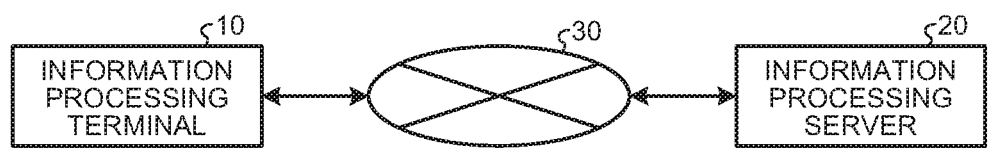
FIG. 2 is a block diagram illustrating a system configuration example of an information processing system according to the embodiment.

Next, a system configuration example of the information processing system according to one embodiment of the present disclosure is described. FIG. 2 is a block diagram illustrating a system configuration example of the information processing system according to the present embodiment. Referring to FIG. 2, the information processing system according to the present embodiment includes an information processing terminal 10 and an information processing server 20. The information processing terminal 10 and the information processing server 20 are connected via a network 30 so as to communicate with each other.

Information Processing Terminal 10

The information processing terminal 10 according to the present embodiment is an information processing device for presenting information using spoken utterances and visual information to a user based on control by the information processing server 20. In this case, one feature of the information processing terminal 10 according to the present embodiment is to visually display an output position of an important part of spoken utterances.

The information processing terminal 10 according to the present embodiment can be implemented as various kinds of devices having a voice output function and a display function. The information processing terminal 10 according to the present embodiment may be, for example, a mobile phone, a smartphone, a table, a wearable device, a computer, or a stationary or autonomous dedicated device.

Information Processing Server 20

The information processing server 20 according to the present embodiment is an information processing device having a function of controlling output of spoken utterances and visual information by the information processing terminal 10. In this case, one feature of the information processing server 20 according to the present embodiment is to visually display an output position of an important part of a spoken utterance on the information processing terminal 10.

Network 30

The network 30 has a function of connecting the information processing terminal 10 and the information processing server 20. The network 30 may include a public line network such as the Internet, a telephone network, or a satellite communication network, and various kinds of local area networks (LANs) and wide area networks (WANs) including Ethernet (registered trademark). The network 30 may include a dedicated line network such as an Internet protocol-virtual private network (IP-VPN). The network 30 may include wireless communication networks such as Wi-Fi (registered trademark) and Bluetooth (registered trademark).

The system configuration example of the information processing system according to the present embodiment has been described. The above-mentioned configuration described above with reference to FIG. 2 is merely an example, and the configuration of the information processing system according to the present embodiment is not limited to the example. For example, the functions of the information processing terminal 10 and the information processing server 20 according to the present embodiment may be implemented by a single device. The configuration of the information processing system according to the present embodiment can be flexibly modified depending on specification and operation.

1.3 Functional Configuration Example of Information Processing Terminal 10

Figure 3:
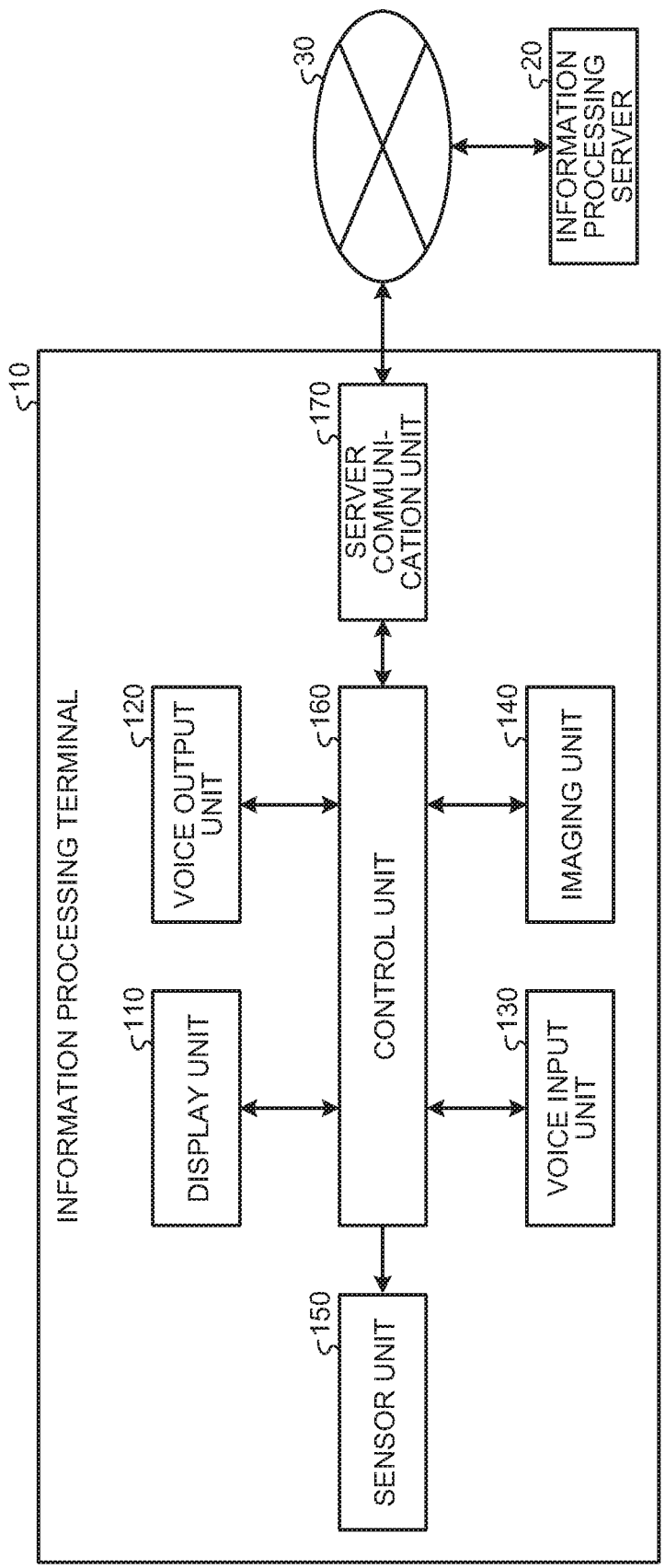
FIG. 3 is a block diagram illustrating a functional configuration example of an information processing terminal 10 according to the embodiment.

Next, a functional configuration example of the information processing terminal 10 according to the present embodiment is described. FIG. 3 is a block diagram illustrating a functional configuration example of the information processing terminal 10 according to the present embodiment. Referring to FIG. 3, the information processing terminal 10 according to the present embodiment includes a display unit 110, a voice output unit 120, a voice input unit 130, an imaging unit 140, a sensor unit 150, a control unit 160, and a server communication unit 170.

Display Unit 110

The display unit 110 according to the present embodiment has a function of outputting visual information such as images and texts. For example, the display unit 110 according to the present embodiment can visually display an output position of an important part of a spoken utterance based on control by the information processing server 20.

Thus, the display unit 110 according to the present embodiment includes a display device for presenting visual information. Examples of the display device include a liquid crystal display (LCD) device, an organic light emitting diode (OLED) device, and a touch panel. The display unit 110 according to the present embodiment may output visual information by a projection function.

Voice Output Unit 120

The voice output unit 120 according to the present embodiment has a function of outputting auditory information including spoken utterances. For example, the voice output unit 120 according to the present embodiment can output an answer to an inquiry from a user by a spoken utterance based on control by the information processing server 20. Thus, the voice output unit 120 according to the present embodiment includes a voice output device such as a speaker and an amplifier.

Voice Input Unit 130

The voice input unit 130 according to the present embodiment has a function of collecting sound information such as utterances by users and background noise. The sound information collected by the voice input unit 130 is used for voice recognition and behavior recognition by the information processing server 20. The voice input unit 130 according to the embodiment includes a microphone for collecting sound information.

Imaging unit 140

The imaging unit 140 according to the present embodiment has a function of taking images including users and ambient environments. The images taken by the imaging unit 140 are used for user recognition and behavior recognition by the information processing server 20. The imaging unit 140 according to the present embodiment includes an imaging device capable of taking images. The above-mentioned images include still images and moving images.

Sensor Unit 150

The sensor unit 150 according to the present embodiment has a function of collecting various kinds of sensor information on the behavior of users. The sensor information collected by the sensor unit 150 is used for user state recognition and behavior recognition by the information processing server 20. For example, the sensor unit 150 includes an acceleration sensor, a gyro sensor, a geomagnetic sensor, a heat sensor, an optical sensor, a vibration sensor, or a global navigation satellite system (GNSS) signal reception device.

Control Unit 160

The control unit 160 according to the present embodiment has a function of controlling the configurations in the information processing terminal 10. For example, the control unit 160 controls the start and stop of each configuration. The control unit 160 can input control signals generated by the information processing server 20 to the display unit 110 and the voice output unit 120. The control unit 160 according to the present embodiment may have the same function as an output control unit 230 as the information processing server 20 described later.

Server Communication Unit 170

The server communication unit 170 according to the present embodiment has a function of communicating information to the information processing server 20 via the network 30. Specifically, the server communication unit 170 transmits sound information collected by the voice input unit 130, image information taken by the imaging unit 140, and sensor information collected by the sensor unit 150 to the information processing server 20. The server communication unit 170 receives control signals related to output of visual information and spoken utterances and artificial voice from the information processing server 20.

The functional configuration example of the information processing terminal 10 according to the present embodiment has been described above. The above-mentioned configurations described with reference to FIG. 3 are merely an example, and the functional configurations of the information processing terminal 10 according to the present embodiment are not limited to the example. For example, the information processing terminal 10 according to the present embodiment is not necessarily required to include all the configurations illustrated in FIG. 3. The information processing terminal 10 may exclude the imaging unit 140 and the sensor unit 150. As described above, the control unit 160 according to the present embodiment may have the same function as the output control unit 230 in the information processing server 20. The functional configuration of the information processing terminal 10 according to the present embodiment can be flexibly modified depending on specifications and operation.

1.4. Functional Configuration Example of Information Processing Server 20

Figure 4:
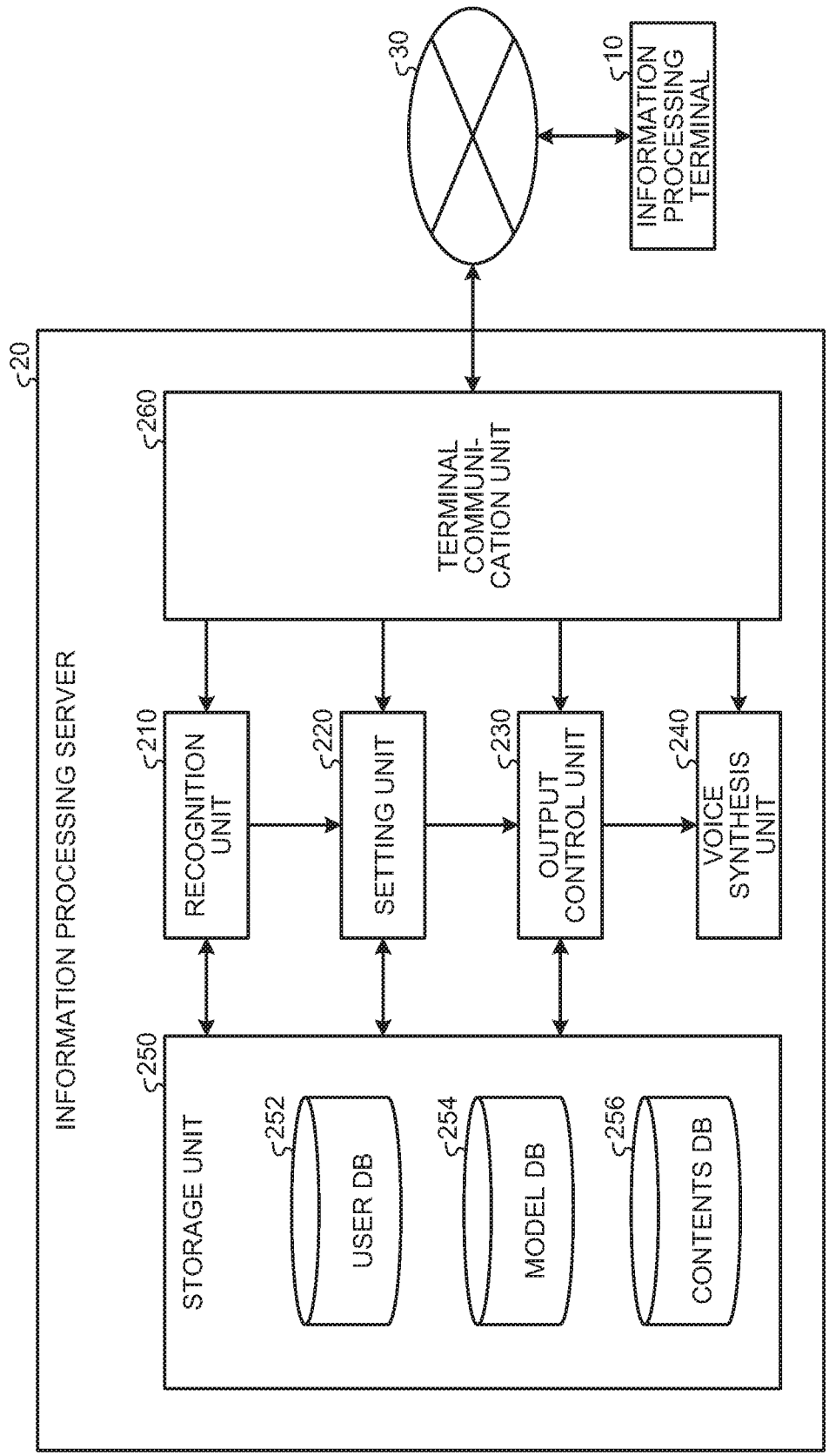
FIG. 4 is a block diagram illustrating a functional configuration example of an information processing server 20 according to the embodiment.

Next, a functional configuration example of the information processing server 20 according to the present embodiment is described. FIG. 4 is a block diagram illustrating a functional configuration example of the information processing server 20 according to the present embodiment. Referring to FIG. 4, the information processing server 20 according to the present embodiment includes a recognition unit 210, a setting unit 220, an output control unit 230, a voice synthesis unit 240, a storage unit 250, and a terminal communication unit 260. The storage unit 250 includes a user DB 252, a model DB 254, and a content DB 256.

Recognition Unit 210

The recognition unit 210 according to the present embodiment has a function of performing various kinds of recognition of users. For example, the recognition unit 210 can recognize users by comparing utterances and images of users collected by the information processing terminal 10 with voice features and images of the users stored in the user DB 252 in advance.

The recognition unit 210 can recognize the behavior and state of users based on sound information, image, and sensor information collected by the information processing terminal 10. For example, the recognition unit 210 can recognize voice based on utterances of users collected by the information processing terminal 10, and detect inquiries and barge-in utterances of users. For example, the recognition unit 210 can recognize the line of sight, expression, gesture, and behavior of users based on images and sensor information collected by the information processing terminal 10.

Setting Unit 220

The setting unit 220 according to the present embodiment has a function of setting an important part of a spoken utterance. The setting unit 220 sets a section including information that is estimated to have a higher priority for a user in a spoken utterance as an important part. In this case, the setting unit 220 according to the present embodiment may set the priority and the important part based on an individual model set for each user or a common model set for a plurality of users in common. For example, the setting unit 220 can acquire an individual model corresponding to a user recognized by the recognition unit 210 from the model DB 254 described later, and set the priority and the important part.

For example, when the recognition unit 210 cannot recognize a user, the setting unit 220 may set an important part based on a common model that is common to all users. The setting unit 220 may acquire, based on an attribute of a user recognized by the recognition unit 210, a common model corresponding to the attribute from a plurality of common models, and set an important part. For example, the setting unit 220 can acquire the common model based on the sex, age, and use language of the user recognized by the recognition unit 210.

The setting unit 220 according to the present embodiment has a function of generating an individual model based on a response utterance or reaction of a user to a spoken utterance. Details of the function of the setting unit 220 are additionally described later.

Output Control Unit 230

The output control unit 230 according to the present embodiment has a function of controlling output of spoken utterances related to information presentation. The output control unit 230 according to the present embodiment has a function of outputting a spoken utterance and visually displaying an output position of an important part of the spoken utterance. In this case, as illustrated in FIG. 1, the output control unit 230 according to the present embodiment may use a bar B and a pointer P to display progress related to the output of the spoken utterance in association with the output position of the important part.

The output control unit 230 according to the present embodiment has a function of controlling whether operation input can be received during the output of the spoken utterance. Details of the function of the output control unit 230 according to the present embodiment are additionally described later.

Voice Synthesis Unit 240

The voice synthesis unit 240 according to the present embodiment has a function of synthesizing artificial voice output from the information processing terminal 10 based on control by the output control unit 230.

Storage Unit 250

The storage unit 250 according to the present embodiment includes a user DB 252, a model DB 254, and a content DB 256.

User DB 252

The user DB 252 according to the present embodiment stores therein various kinds of information on users. For example, the user DB 252 stores face images and voice features of users therein. The user DB 252 may store information such as the sex, age, preferences, and tendency of users therein.

Model DB 254

The model DB 254 according to the present embodiment stores therein an individual model set for each user and a common model common to a plurality of users. As described above, the above-mentioned common model may be a model common to all users, or may be a model set for each attribute of users. The setting unit 220 can acquire a corresponding model from the model DB 254 based on a recognition result of a user by the recognition unit 210, and set an important part.

Content DB 256

For example, the content DB 256 according to the present embodiment stores therein various kinds of contents such as information on restaurants. The output control unit 230 according to the present embodiment can use information stored in the content DB 256 to output an answer to an inquiry from a user, recommendation information, and advertisements by using spoken utterances and visual information. The contents according to the present embodiment are not necessarily stored in the content DB 256. For example, the output control unit 230 according to the present embodiment may acquire contents from another device through the network 30.

Terminal communication unit 260

The terminal communication unit 260 according to the present embodiment has a function of communicating information to the information processing terminal 10 via the network 30. Specifically, the terminal communication unit 260 receives sound information such as utterances, image information, and sensor information from the information processing terminal 10. The terminal communication unit 260 transmits control signals generated by the output control unit 230 and artificial voice synthesized by the voice synthesis unit 240 to the information processing terminal 10.

The functional configuration example of the information processing server 20 according to the present embodiment has been described above. The above-mentioned functional configurations described with reference to FIG. 4 are merely an example, and the functional configuration of the information processing server 20 according to the present embodiment is not limited to the example. For example, the information processing server 20 is not necessarily required to include all the configurations illustrated in FIG. 4. The recognition unit 210, the setting unit 220, the voice synthesis unit 240, and the storage unit 250 may be included in another device different from the information processing server 20. The functional configuration of the information processing server 20 according to the present embodiment can be flexibly modified depending on specifications and operation.

1.5. Details of Model Construction and Output Control

Next, the details of model construction and output control by the information processing server 20 according to the present embodiment are described. As described above, one feature of the information processing server 20 according to the present embodiment is to output a spoken utterance including an important part and a non-important part and visually display an output position of the important part of the spoken utterance. The above-mentioned feature of the information processing server 20 enables a user to clearly perceive an output position of an important part of a spoken utterance to greatly improve the convenience of information presentation using the spoken utterance.

In this case, the information processing server 20 according to the present embodiment can use a model corresponding to a recognized user to set the priority and an important part. More specifically, the setting unit 220 according to the present embodiment can acquire, based on the result of recognition by the recognition unit 210, an individual model set for each user or a common model set for a plurality of users in common, and set the priority and an important part.

As described above, an important part according to the present embodiment is a section including information that is estimated to have a higher priority for a user in information presented by a spoken utterance. For example, in the case of information presentation related to a restaurant exemplified in FIG. 1, it is estimated that important information, that is, information having a high priority, differs depending on users. For example, one user may be interested in price information but another user may give importance to the atmosphere or location.

Thus, the information processing server 20 according to the present embodiment generates an individual model for each user, and sets an important part based on the individual model, thereby being capable of implementing output control corresponding to the need for each user. In this case, for example, the setting unit 220 according to the present embodiment may generate an individual model based on an utterance of a user. Examples of the utterance of the user include an utterance related to an inquiry.

FIG. 5 is a diagram for describing the generation of an individual model based on an inquiry utterance according to the present embodiment. FIG. 5 illustrates a situation where a user U1 makes an inquiry to the information processing terminal 10 by utterances UO1 and UO2. Both the utterances UO1 and UO2 related to the inquiry may be requests for information presentation of restaurants.

In this case, the setting unit 220 according to the present embodiment can generate an individual model corresponding to the user U1 based on vocabularies included in the utterances UO1 and UO2 of the user U1 recognized by the recognition unit 210. For example, the setting unit 220 may estimate that the user U1 tends to give importance to the price based on a vocabulary "inexpensive store" included in the utterance UO1 or a vocabulary "budget is 3,000 yen" included in the utterance UO2, and generate an individual model reflecting the estimation result.

The above-mentioned utterance of the user is not limited to an inquiry. The setting unit 220 according to the present embodiment may generate an individual model based on a response utterance of the user to an output spoken utterance.

Figure 6B:
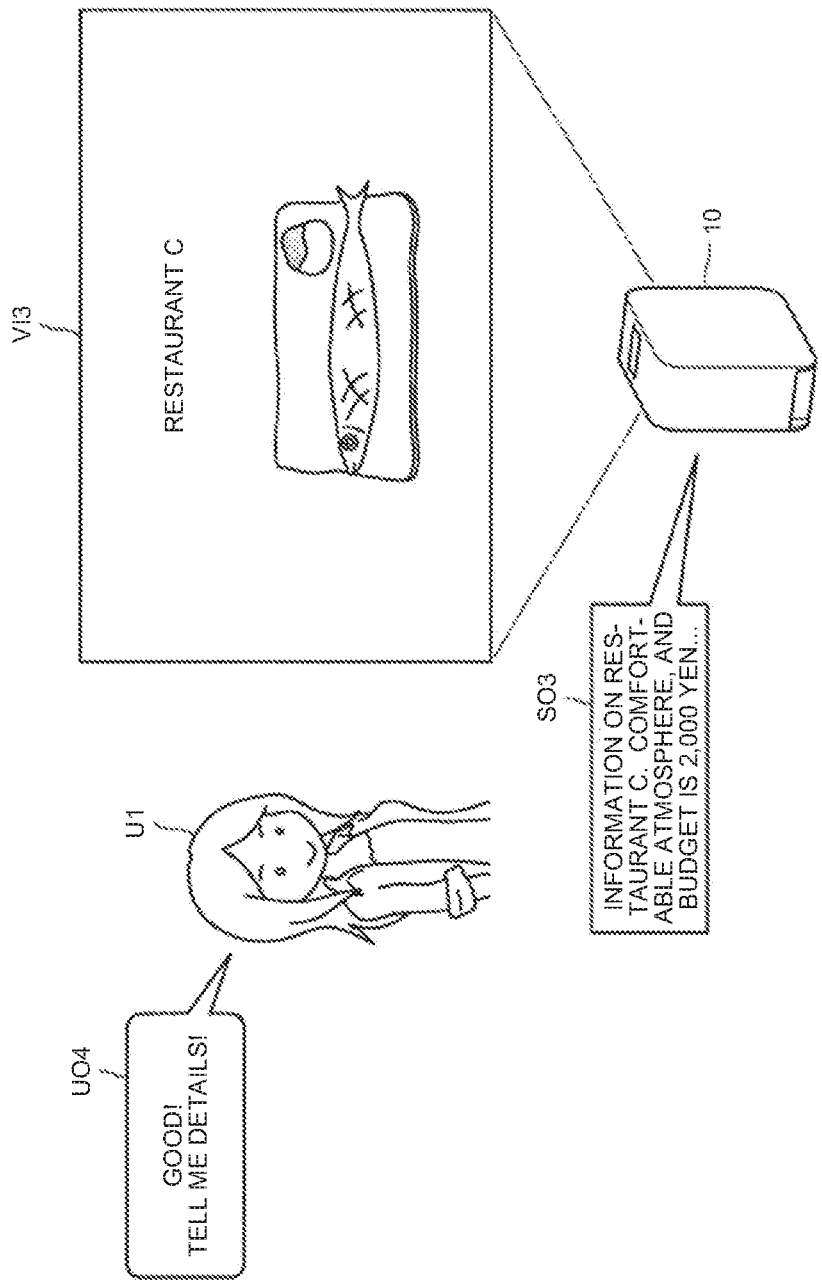
FIG. 6B is a diagram for describing generation of an individual model based on a response utterance of a user according to the embodiment.

FIGS. 6A and 6B are diagrams for describing the generation of an individual model based on a response utterance of a user. FIG. 6A illustrates a situation where the user U1 makes an utterance UO3 indicating a response to a spoken utterance SO2 output by the information processing terminal 10. In this case, the user U1 makes the utterance UO3 at a timing at which price information included in the spoken utterance SO2 is output, and the utterance UO3 is a barge-in utterance that instructs output of the next restaurant information.

In this case, the setting unit 220 according to the present embodiment may estimate that the user U1 tends to give importance to the price based on the fact that information that has been output when the utterance UO3 indicating a response is detected is price information and the fact that the utterance UO3 is a barge-in utterance that instructs output of the next restaurant information, and generate an individual model reflecting the estimation result.

FIG. 6B illustrates a situation where the user U1 makes an utterance UO4 indicating a response to a spoken utterance SO3 output by the information processing terminal 10. In this case, the user U1 makes the utterance UO4 at a timing at which price information included in the spoken utterance SO3 is output, and the utterance UO4 is a barge-in utterance that instructs output of detailed information.

In this case, the setting unit 220 according to the present embodiment can estimate that the user U1 tends to give importance to the price based on the fact that information that has been output when the utterance UO4 indicating a response is detected is price information and the fact that the utterance UO4 is a barge-in utterance that instructs output of detailed information, and generate an individual model reflecting the estimation result.

In this manner, the setting unit 220 according to the present embodiment can estimate an item important for a user and generate an individual model based on a response utterance such as a barge-in utterance and a spoken utterance that is being output. With the above-mentioned function of the setting unit 220 according to the present embodiment, a response utterance of a user to an output spoken utterance can be monitored to estimate an item important for a user with high accuracy.

Figure 7:
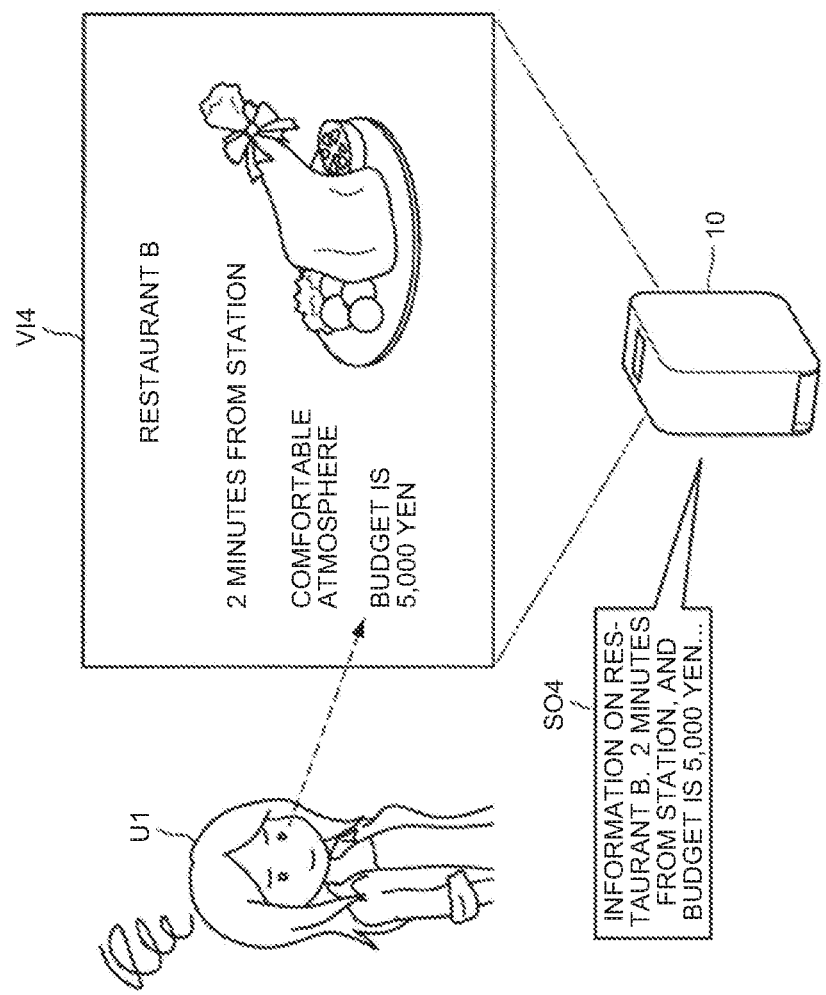
FIG. 7 is a diagram for describing generation of an individual model based on reaction of a user to information presentation according to the embodiment.

The setting unit 220 according to the present embodiment may generate an individual model based on a reaction of a user independent from an utterance. FIG. 7 is a diagram for describing the generation of an individual model based on a reaction of a user to information presentation. FIG. 7 illustrates a reaction of the user U1 to a spoken utterance SO4 and visual information VI4 output by the information processing terminal 10. Examples of the reaction include the expression, line of sight, gesture, and behavior of the user. One example illustrated in FIG. 7 indicates a situation where the user U1 gazes at price information included in the visual information VI4.

In this case, the setting unit 220 according to the present embodiment can estimate that the user U1 tends to give importance to the price based on the fact that the user U1 gazes at the displayed price information, and generate an individual model reflecting the estimation result.

For example, in the case where it is recognized that the user U1 is not listening with concentration to voice output of information related to the location or atmosphere during the voice output, the setting unit 220 may estimate that the user U1 does not give importance to the location or atmosphere, and reflect the estimation result to an individual model. In this manner, the setting unit 220 according to the present embodiment can generate highly accurate individual models based on various reactions of users.

The details of the individual model according to the present embodiment have been described above. Subsequently, the details of output control based on a common model according to the present embodiment are described. Situations where output control based on individual models is difficult to perform on individual users are assumed, such as when information on tendencies of users has not been sufficiently accumulated and when the information processing terminal 10 is a device used by an unspecified number of users. In such cases, the information processing server 20 according to the present embodiment may display an output position of an important part based on a common model set for a plurality of users in common.

Figure 8:
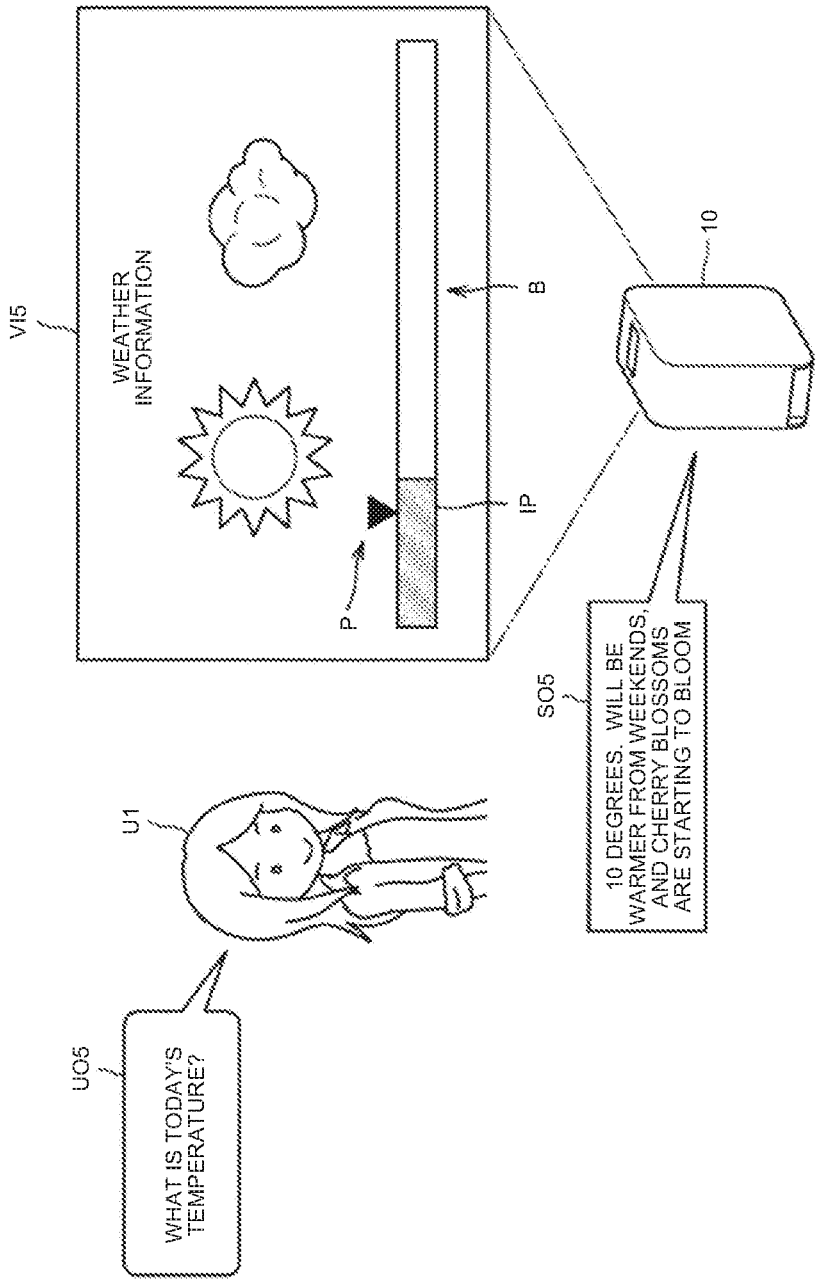
FIG. 8 is a diagram for describing output control based on a common model according to the embodiment.

FIG. 8 is a diagram for describing output control based on a common model according to the present embodiment. FIG. 8 illustrates an utterance UO5 of the user U1 related to an inquiry about weather, and a spoken utterance SO5 and visual information VI5 output by the information processing terminal 10 in response to the utterance UO5.

In this case, the setting unit 220 according to the present embodiment can set an important part in accordance with a common model common to users. In one example illustrated in FIG. 8, the setting unit 220 sets, as an important part, information corresponding to an answer related to the inquiry from the user U1 in information included in the spoken utterance SO5. Specifically, the setting unit 220 may set an answer part "10 degrees" corresponding to the utterance UO5 related to the inquiry in the information included in the spoken utterance SO5 as an important part. In this manner, in the output control based on a common model according to the present embodiment, an answer part for an inquiry from a user is set as an important part, thus enabling the user to perceive the output position of information having a higher priority for the user.

The information processing server 20 according to the present embodiment may display an output position of an important part based on a common model corresponding to an attribute of a user. For example, it is assumed that a male user in his 50s and a female user in 20s tend to give importance to different items. Thus, the setting unit 220 according to the present embodiment sets an important part by using a common model corresponding to an attribute of a user recognized by the recognition unit 210, thus being capable of implementing the highly accurate setting of the important part.

Figure 9:
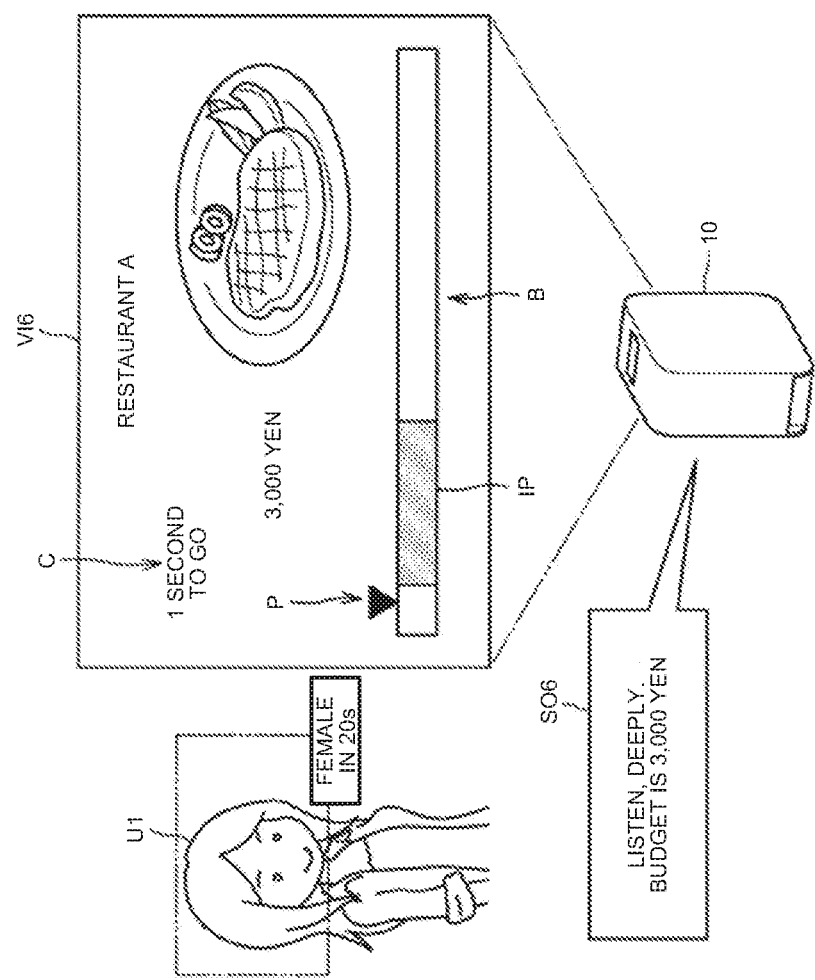
FIG. 9 is a diagram for describing output control using a common model corresponding to an attribute of a user according to the embodiment.

FIG. 9 is a diagram for describing output control using a common model corresponding to an attribute of a user according to the present embodiment. In one example illustrated in FIG. 9, the setting unit 220 can estimate that a user with the attribute corresponding to the user U1 tends to give importance to price information based on a common model acquired based on the sex and age of the user U1 recognized by the recognition unit 210, and set the price information as an important part.

The above-mentioned function of the setting unit 220 according to the present embodiment enables highly accurate estimation of important parts to be implemented to enhance the convenience for users even when user's personal data is insufficient or absent. The common model corresponding to the attribute of the user may be set in advance or may be generated by diverting the individual model. For example, the setting unit 220 may generate a common model corresponding to the attribute by averaging a plurality of generated individual models for each attribute.

The output control based on the individual model and the common model according to the present embodiment has been described above. In the above description, examples where the output control unit 230 uses a bar B and a pointer P to visually display an output position of an important part have been mainly described. However, the output control unit 230 according to the present embodiment can perform various kind of output control without being limited to the above-mentioned examples.

For example, as illustrated in FIG. 9, the output control unit 230 according to the present embodiment may display a countdown C to more explicitly present a time until voice of an important part IP is output to a user. For example, the output control unit 230 can visually present an important part to a user by including price information "3,000 yen" in the visual information IV6 in advance.

The output control unit 230 may control an output form of a spoken utterance of an important part. For example, in one example illustrated in FIG. 9, the output control unit 230 emphasizes that an important part is output to the user U1 by outputting a spoken utterance SO6 including an emphasized phrase "Listen, deeply". The output control unit 230 may cause the user U1 to pay attention by controlling the volume, tone, and rhythm related to the voice output SO6.

1.6. Output Control Corresponding to Users

Next, output control corresponding to users according to the present embodiment is described. In the above description, the output control for a single user has been described. On the other hand, even when there are users, the information processing server 20 according to the present embodiment can appropriately control the display of an output position of an important part corresponding to each user.

Figure 10:
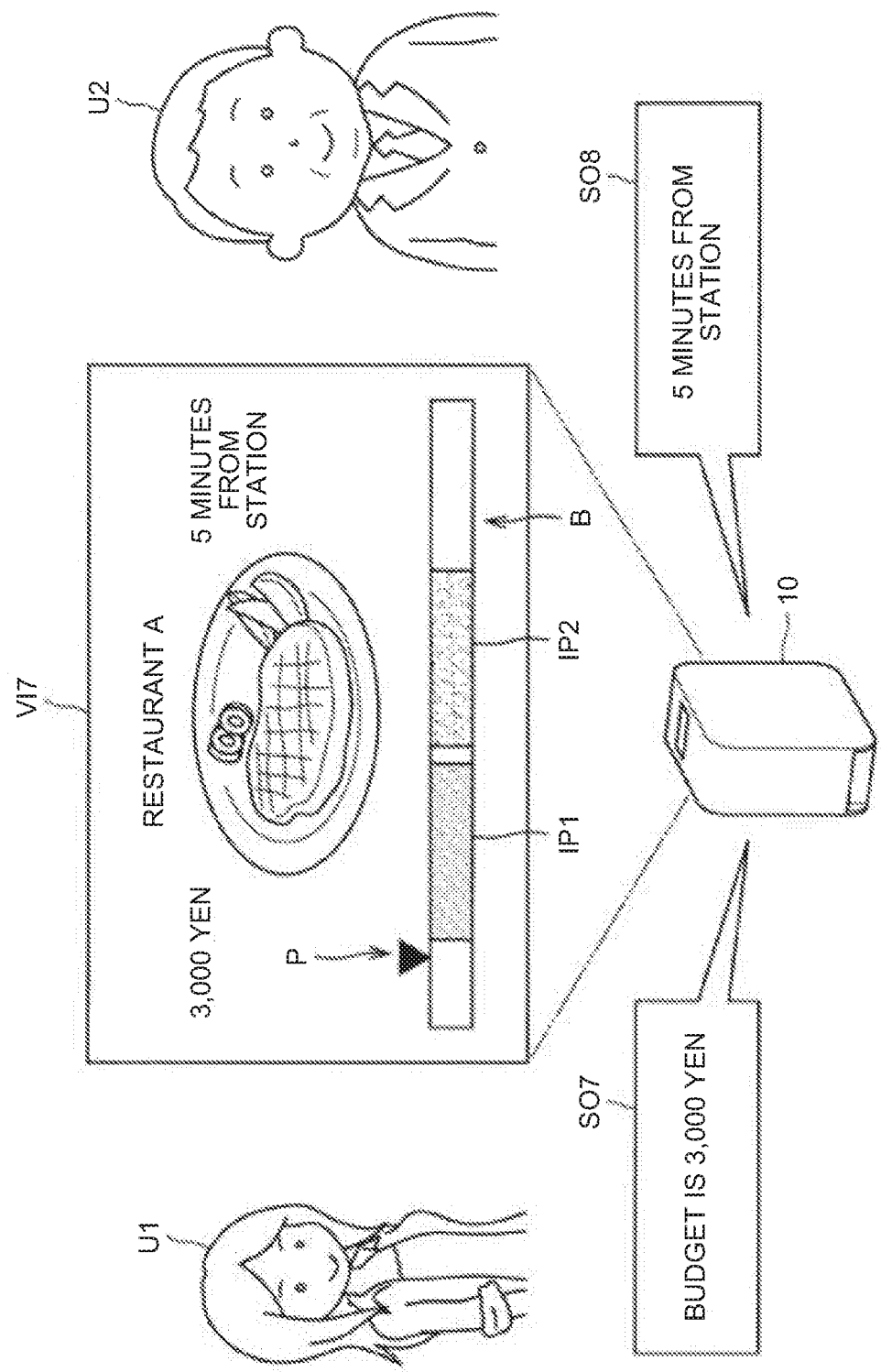
FIG. 10 is a diagram for describing output control corresponding to a plurality of users according to the embodiment.

FIG. 10 is a diagram for describing output control corresponding to users according to the present embodiment. FIG. 10 illustrates users U1 and U2 and visual information IV7 and spoken utterances SO7 and SO8 output by the information processing terminal 10.

In this case, the setting unit 220 according to the present embodiment acquires models corresponding to the users U1 and U2 recognized by the recognition unit 210 from the model DB 254, and individually sets important parts to the users U1 and U2. In one example illustrated in FIG. 10, the setting unit 220 sets price information as an important part for the user U1, and sets location information as an important part for the user U2.

The output control unit 230 displays output positions of important parts IP1 and IP2 corresponding to the users U1 and U2, respectively, based on the degrees of importance set by the setting unit 220. In this manner, even when there are users, the information processing server 20 according to the present embodiment can display the output positions of the important parts corresponding to the respective users based on the individual models corresponding to the users. The above-mentioned function of the information processing server 20 according to the present embodiment enables respective users to grasp when desired information is output, thus being capable of implementing more convenient information presentation.

In this case, the output control unit 230 according to the present embodiment may control the output of spoken utterances and visual information depending on the position of a recognized user. For example, in one example illustrated in FIG. 10, the output control unit 230 outputs the spoken utterance SO7 including price information in a direction in which the user U1 is located, and outputs the spoken utterance SO8 including location information in a direction in which the user U2 is located. The output control unit 230 can implement the above-mentioned processing by controlling a beamforming function of the voice output unit 120.

As illustrated in FIG. 10, the output control unit 230 may display the price information, which is important for the user U1, at a position that is easily visually recognized by the user U1, and display the location information, which is important for the user U2, at a position that is easily visually recognized by the user U2. The above-mentioned function of the output control unit 230 according to the present embodiment enables a user to more easily perceive information related to an important part to enhance the convenience of information presentation.

Figure 11:
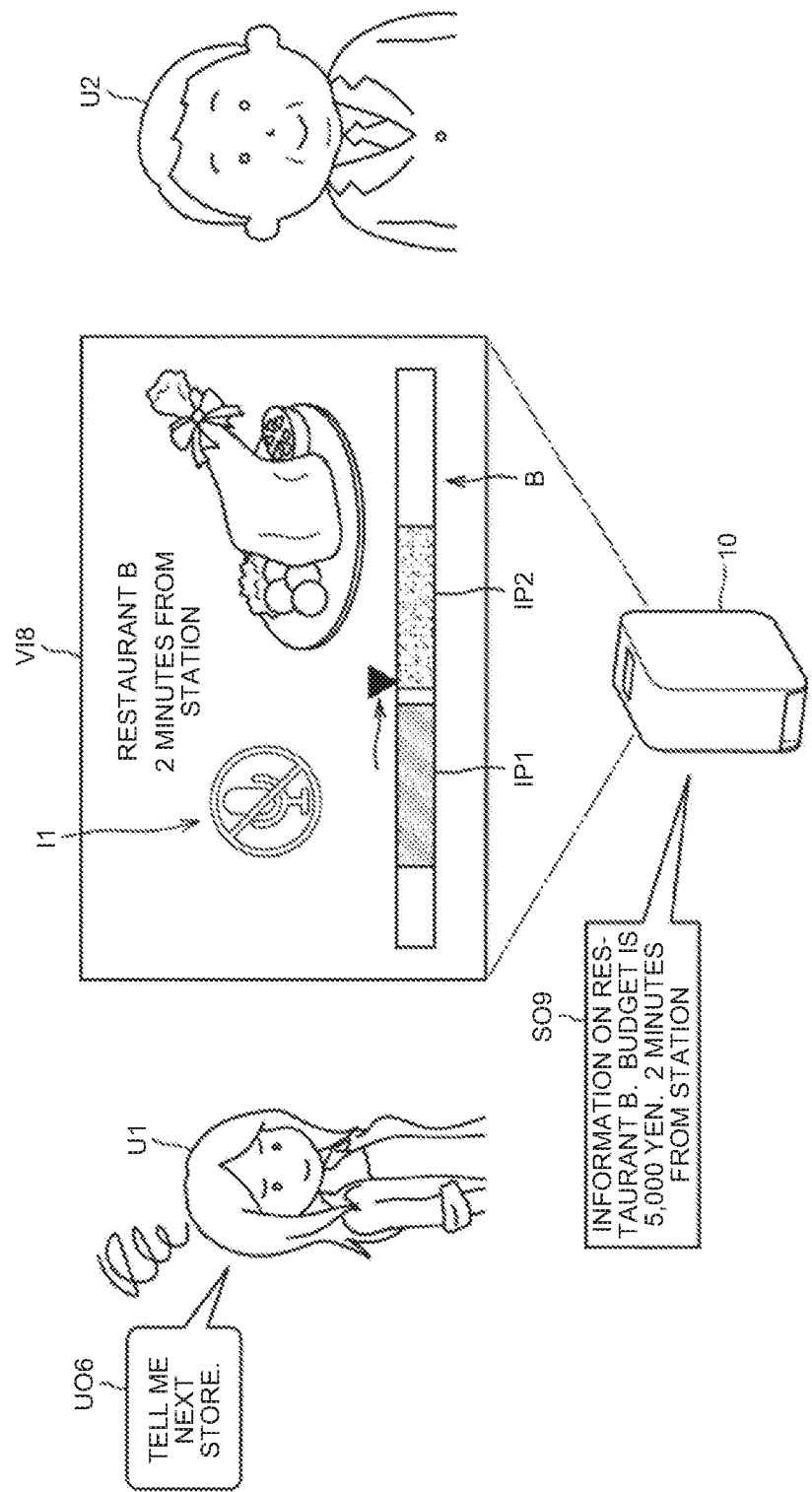
FIG. 11 is a diagram for describing control as to whether operation input can be received according to the embodiment.

The output control unit 230 according to the present embodiment may control whether operation input can be received during output of a spoken utterance depending on output positions of important parts related to users. FIG. 11 is a diagram for describing control as to whether operation input can be received according to the present embodiment. Similarly to the case in FIG. 10, FIG. 11 illustrates the output positions of the important parts IP1 and IP2 corresponding to the users U1 and U2, respectively, as visual information V18.

In this case, the user U1 makes an utterance UO6 that instructs output of the next restaurant information at a timing at which the output of the important part IP1 corresponding to price information that is important for the user U1 is finished. Referring to FIG. 11, however, it is understood that voice output of the important part IP2 corresponding to the location information that is important for the user U2 has not been completed at the above-mentioned timing.

In such a case, the output control unit 230 according to the present embodiment may control not to receive operation input made by the user U1 until the voice output corresponding to the important part IP2 corresponding to the user U2 is completed. Specifically, the output control unit 230 according to the present embodiment refuses receiving the operation input made by a second user (user U1) before or during output of an important part corresponding to a first user (user U2), so that the first user can be prevented from failing to hear a spoken utterance corresponding to the important part.

In this case, as illustrated in FIG. 11, the output control unit 230 may display an icon I1 to explicitly indicate that operation input cannot be received. The above-mentioned operation input includes a barge-in utterance as illustrated in FIG. 11 and stop processing of information output made by a button operation. The above-mentioned function of the output control unit 230 according to the present embodiment can effectively prevent cut-in processing by another user before voice output of an important part is completed.

The output control unit 230 according to the present embodiment may control output of spoken utterances and visual information based on operation input detected before an important part is output. For example, in the case where the user U1 makes the utterance UO6, which is a barge-in utterance, at the timing illustrated in FIG. 11, the output control unit 230 may shift to presentation of the next restaurant information after voice output corresponding to the important part IP2 is completed based on the fact that the voice output of the important part IP2 has not been completed. The output control unit 230 may shift to presentation of the next restaurant information after location information corresponding to the important part IP2 is displayed as the visual information V18.

On the other hand, in the case where operation input made by the second user is detected during the output of an important part corresponding to the first user, the output control unit 230 according to the present embodiment may control as to whether the operation input can be received based on the degree of concentration of the first user.

Figure 12:
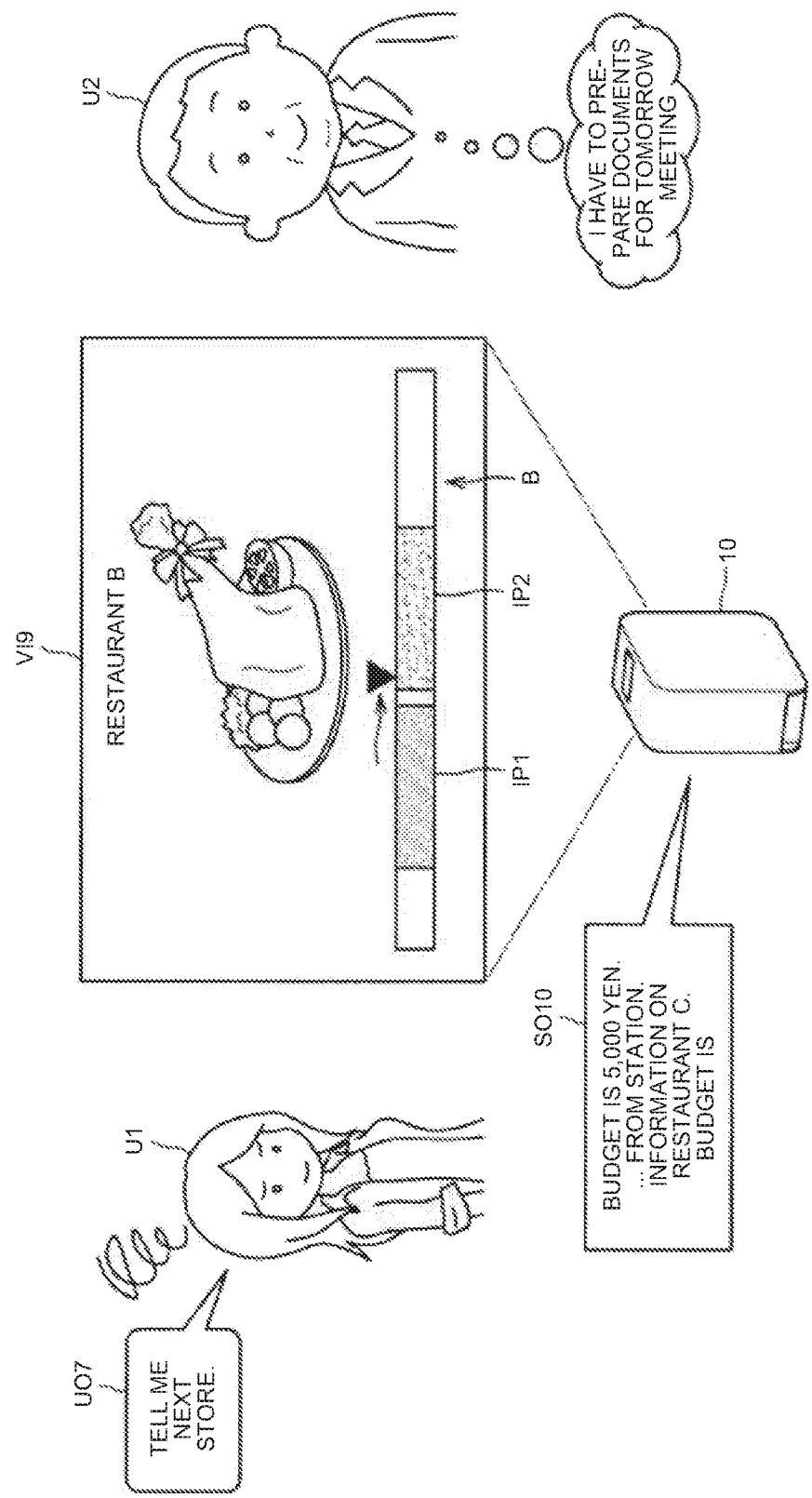
FIG. 12 is a diagram for describing control as to whether operation input can be received based on the degree of concentration of a user according to the embodiment.

FIG. 12 is a diagram for describing control as whether operation input can be received based on the degree of concentration of a user according to the present embodiment. In one example illustrated in FIG. 12, similarly to the case in FIG. 11, the user U1 makes an utterance UO7 that instructs output of the next restaurant information at the timing at which the voice output of the important part IP1 corresponding to price information that is important for the user U1 is finished.

In one example illustrated in FIG. 12, on the other hand, the user U2 does not listen to a spoken utterance SO10 though voice output of the important part IP2 corresponding to location information that is important for the user U2 has been started. In such a case, the output control unit 230 according to the present embodiment may receive operation input made by the user U1 and shift to presentation of the next restaurant information based on the fact that it is detected that the degree of concentration of the user U2 is low during the voice output of the important part IP2. The above-mentioned function of the output control unit 230 according to the present embodiment can eliminate the influence of a user who is not concentrated in a spoken utterance and preferentially receive an instruction from another user to efficiently improve the overall convenience.

Figure 13:
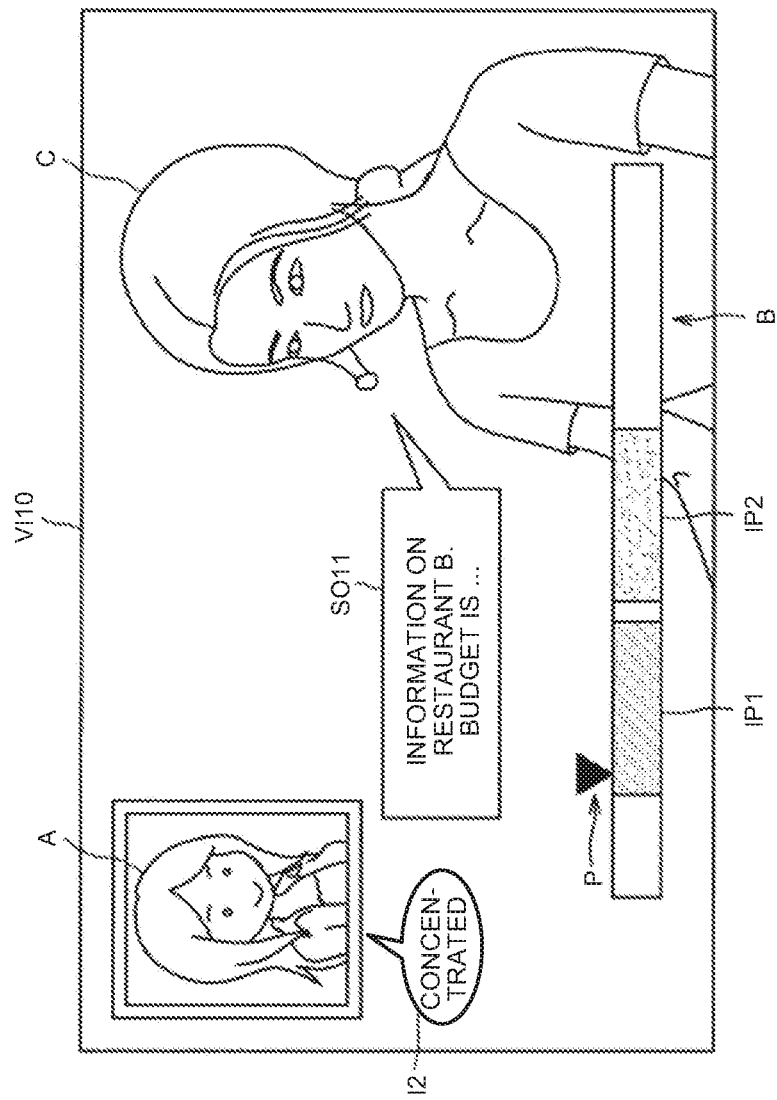
FIG. 13 is a diagram for describing display control of the degree of concentration according to the embodiment.

The output control unit 230 according to the present embodiment may visually display the degree of concentration of a user detected by the recognition unit 210. FIG. 13 is a diagram for describing display control of the degree of concentration according to the present embodiment. FIG. 13 illustrates visual information VI10 displayed in a virtual space shared by users. In this manner, for example, the output control unit 230 according to the present embodiment can implement output control of the visual information VI10 displayed by a head-mount display information processing terminal 10.

In this case, for example, the output control unit 230 may control output of information presentation by a virtual character C. Specifically, the output control unit 230 controls visual information related to the virtual character C and output of a spoken utterance SO11 corresponding to a script of the virtual character C. The output control unit 230 displays output positions of the important parts IP1 and IP2 in the spoken utterance SO11 by using the bar B and the pointer P.

In such a virtual space, the users cannot perceive their substances in many cases, and, for example, each user can grasp the states of other users through avatars A. Thus, it is difficult for each user to determine how other users are actually concentrated in listening to the utterance voice SO11.

In view of the above, the output control unit 230 according to the present embodiment displays an avatar A in association with an icon 12 indicating the degree of concentration of a user corresponding to the avatar A, so that other users can be caused to perceive the degree of concentration corresponding to the spoken utterance SO11 of the user corresponding to the avatar A.

For example, when the visual information VI10 is the line of sight of the user U2 illustrated in FIG. 12 and the user corresponding to the avatar A is the user U1, the user U2 can grasp that the user U1 is concentrated in the voice output corresponding to the important part IP1 by visually recognizing the icon 12. In this manner, the above-mentioned function of the output control unit 230 according to the present embodiment can cause a user to visually grasp the degree of concentration of another user to prevent unintentional hindrance of listening behavior of the other user.

1.7. Flow of Processing

Figure 14:
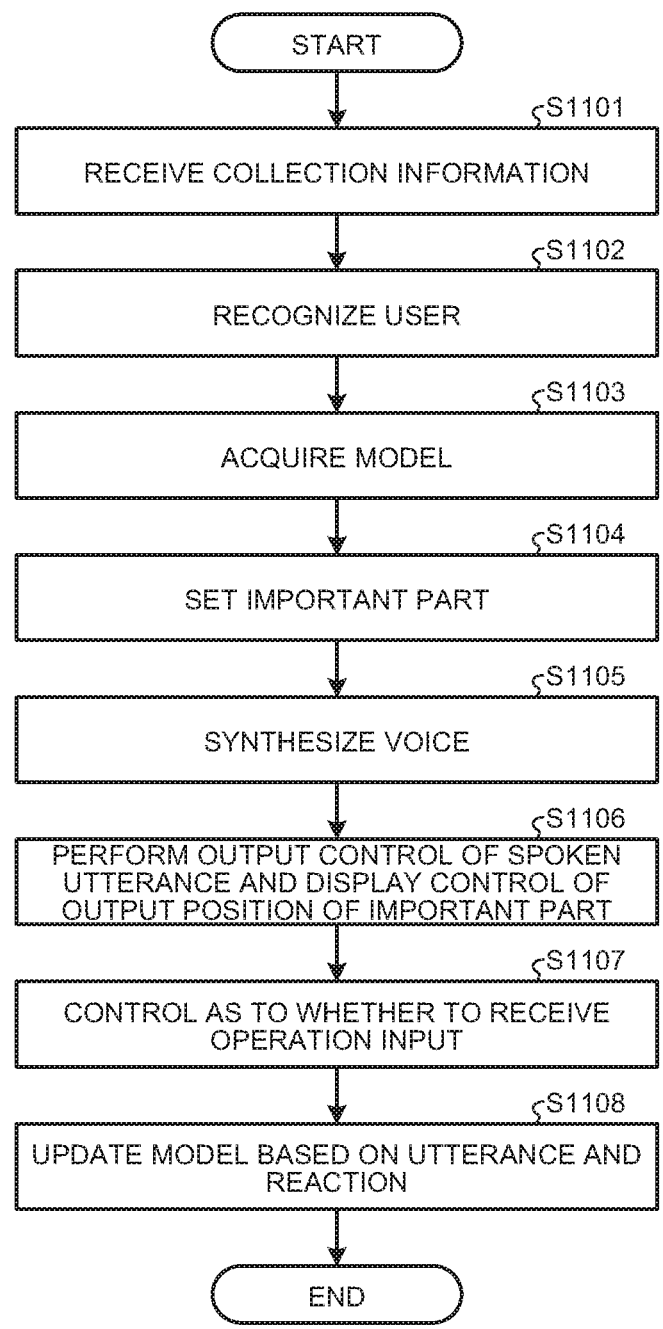
FIG. 14 is a flowchart illustrating the flow of processing by the information processing server according to the embodiment.

Next, the flow of processing by the information processing server 20 according to the present embodiment is described in detail. FIG. 14 is a flowchart illustrating the flow of processing by the information processing server 20 according to the present embodiment.

Referring to FIG. 14, first, the terminal communication unit 260 in the information processing server 20 receives collection information collected by the information processing terminal 10 (S1101). The above-mentioned collection information includes sound information including utterances of a user, image information including the user, and sensor information related to the user.

Subsequently, the recognition unit 210 recognizes the user based on the collection information received at Step S1101 (S1102). The recognition unit 210 may continuously recognize the state or behavior of the user to calculate the degree of concentration.

Next, the setting unit 220 acquires a model corresponding to the user recognized at Step S1102 from the model DB 254 (S1103). In this case, the setting unit 220 may acquire an individual model corresponding to the user specified at Step S1102, or may acquire a common model corresponding to an attribute of the recognized user.

Subsequently, the setting unit 220 sets an important part of a spoken utterance based on the model acquired at Step S1103 (S1104).

Next, the output control unit 230 controls the voice synthesis unit 240 to synthesize artificial voice corresponding to the spoken utterance including the important part set at Step S1104 (S1105).

Subsequently, the output control unit 230 controls the output of the spoken utterance, and displays an output position of the important part calculated based on the important part set at Step S1103 and the artificial voice synthesized at Step S1105 on the display unit 110 (S1106).

In parallel with the output control at Step S1106, the output control unit 230 controls whether operation input by the user can be received (S1107).

When a response utterance or reaction of the user to the spoken utterance is detected, the setting unit 220 updates the corresponding model based on the response utterance or the reaction (S1108).

2. HARDWARE CONFIGURATION EXAMPLE

Figure 15:
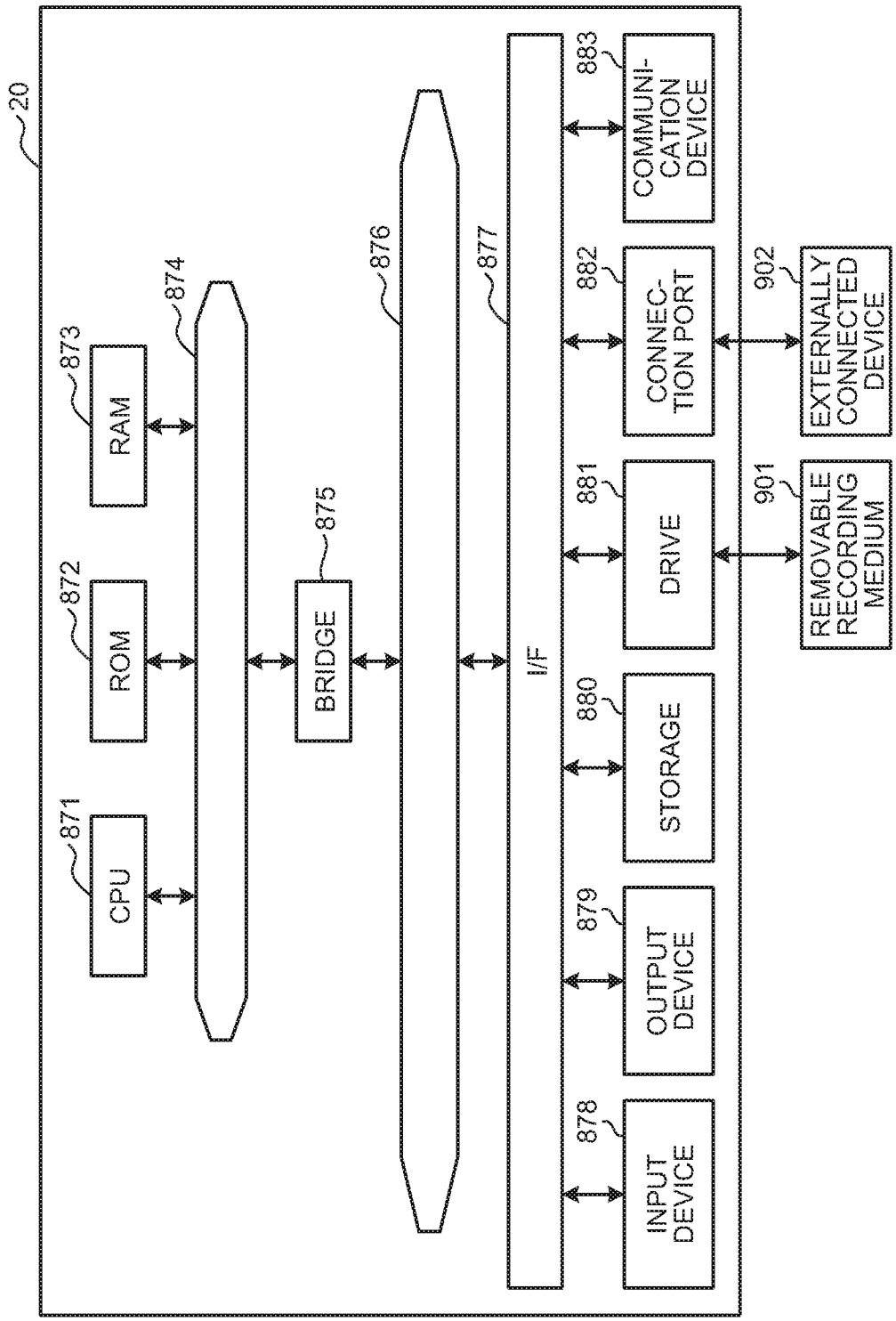
FIG. 15 is a hardware configuration example common to the information processing terminal and the information processing server according to one embodiment of the present disclosure.

Next, a hardware configuration example common to the information processing terminal 10 and the information processing server 20 according to one embodiment of the present disclosure is described. FIG. 15 is a block diagram illustrating a hardware configuration example of the information processing terminal 10 and the information processing server 20 according to one embodiment of the present disclosure. Referring to FIG. 15, the information processing terminal 10 and the information processing server 20 include, for example, a CPU 871, a ROM 872, a RAM 873, a host bus 874, a bridge 875, an external bus 876, an interface 877, an input device 878, an output device 879, storage 880, a drive 881, a connection port 882, and a communication device 883. The illustrated hardware configuration is an example, and a part of the components may be omitted. The hardware configuration may further include a component other than the illustrated components.

CPU 871

The CPU 871 functions as, for example, an arithmetic processing unit or a control device, and controls the overall or partial operation of each component based on various control programs recorded in the ROM 872, the RAM 873, the storage 880, or a removable recording medium 901.

ROM 872, RAM 873

The ROM 872 is means for storing therein computer programs read onto the CPU 871 and data used for calculation. In the RAM 873, for example, computer programs read onto the CPU 871 and various parameters that change as appropriate when the computer programs are executed are temporarily or permanently stored.

Host Bus 874, Bridge 875, External Bus 876, Interface 877

For example, the CPU 871, the ROM 872, and the RAM 873 are mutually connected through the host bus 874 capable of high-speed data transmission. On the other hand, for example, the host bus 874 is connected to the external bus 876 the data transmission speed of which is relatively low through the bridge 875. The external bus 876 is connected to various components through the interface 877.

Input Device 878

For the input device 878, for example, a mouse, a keyboard, a touch panel, a button, a switch, and a lever are used. For the input device 878, a remote controller capable of transmitting control signals by using infrared rays or other radio waves may be used. The input device 878 includes a voice input device such as a microphone.

Output Device 879

The output device 879 is a device capable of visually or aurally notifying a user of acquired information, for example, a display device such as a cathode ray tube (CRT), an LCD, or an organic EL, an audio output device such as a speaker or headphones, a printer, a mobile phone, or a facsimile machine. The output device 879 according to the present disclosure includes various vibration devices capable of outputting tactile stimulation.

Storage 880

The storage 880 is a device for storing various kinds of data therein. For the storage 880, for example, a magnetic storage device such as a hard disk drive (HDD), a semiconductor storage device, an optical storage device, or a magnetooptical storage device is used.

Drive 881

The drive 881 is, for example, a device for reading information recorded in the removable recording medium 901 such as a magnetic disk, an optical disc, a magnetooptical disk, or a semiconductor memory, or writing information into the removable recording medium 901.

Removable Recording Medium 901

The removable recording medium 901 is, for example, a DVD medium, a Blu-ray (registered trademark) medium, an HD DVD medium, or various kinds of semiconductor storage media. It should be understood that the removable recording medium 901 may be, for example, an IC card having a noncontact IC chip mounted thereon, or an electronic device.

Connection Port 882

The connection port 882 is, for example, a port for connecting the external connection device 902, such as a universal serial bus (USB) port, an IEEE 1394 port, a small computer system interface (SCSI), an RS-232C port, or an optical audio terminal.

External Connection Device 902

The external connection device 902 is, for example, a printer, a portable music player, a digital camera, a digital video camera, or an IC recorder.

Communication Device 883

The communication device 883 is a communication device for connection to a network, and is, for example, a communication card for wired or wireless LAN, Bluetooth (registered trademark), or wireless USB (WUSB), a router for optical communication, a router for asymmetric digital subscriber line (ADSL), or a modem for various kinds of communication.

3. CONCLUSION

As described above, the information processing server 20 according to one embodiment of the present disclosure can output a spoken utterance to the information processing terminal 10, and visually display an output position of an important part of the spoken utterance. This configuration enables a user to perceive the output position of the important part in information presentation made by the spoken utterance.

While exemplary embodiments of the present disclosure have been described above in detail with reference to the accompanying drawings, the technical scope of the present disclosure is not limited to the examples. It is obvious that a person with ordinary skills in the technical field of the present disclosure could conceive of various kinds of changes and modifications within the range of the technical concept described in the claims. It should be understood that the changes and the modifications belong to the technical scope of the present disclosure.

The effects described herein are merely demonstrative or illustrative and are not limited. In other words, the features according to the present disclosure could exhibit other effects obvious to a person skilled in the art from the descriptions herein together with or in place of the above-mentioned effects.

The steps related to the processing of the information processing server 20 herein are not necessarily required to be processed in chronological order described in the flowchart. For example, the steps related to the processing of the information processing server 20 may be processed in an order different from the order described in the flowchart, or may be processed in parallel.

The following configurations also belong to the technical scope of the present disclosure.

(1)

An information processing device, comprising an output control unit that controls output of a spoken utterance related to information presentation, wherein the output control unit outputs the spoken utterance, and visually displays an output position of an important part of the spoken utterance.

(2)

The information processing device according to (1), wherein the spoken utterance includes:

the important part including information that is estimated to have a high priority for a user; and a non-important part including information having priority that is lower than the priority of the important part.

(3)

The information processing device according to (1) or (2), wherein the output control unit outputs progress related to the output of the spoken utterance in association with the output position of the important part.

(4)

The information processing device according to any one of (1) to (3), wherein the output control unit displays the output position of the important part based on an individual model set for each of users.

(5)

The information processing device according to (4), wherein the output control unit displays the output position of the important part corresponding to each of the users based on the individual model related to each of the users.

(6)

The information processing device according to any one of (1) to (3), wherein the output control unit displays the output position of the important part based on a common model set for a plurality of users in common.

(7)

The information processing device according to (6), wherein the output control unit displays the output position of the important part based on the common model corresponding to an attribute of the user.

(8)

The information processing device according to any one of (1) to (7), wherein the output control unit controls whether to receive an operation input during the output of the spoken utterance.

(9)

The information processing device according to (8), wherein the output control unit refuses receiving the operation input made by a second user before or during output of the important part corresponding to a first user.

(10)

The information processing device according to (8), wherein, when the output control unit detects the operation input made by a second user during output of the important part corresponding to a first user, the output control unit controls whether to receive the operation input based on a degree of concentration of the first user.

(11)

The information processing device according to any one of (8) to (10), wherein the output control unit controls output of at least one of the spoken utterance and visual information based on the operation input detected before or during output of the important part.

(12)

The information processing device according to any one of (8) to (11), wherein the operation input includes a barge-in utterance.

(13)

The information processing device according to (4) or (5), wherein the individual model is generated based on an utterance of the user.

(14)

The information processing device according to (4), 5, or 13, wherein the individual model is generated based on reaction of the user to the information presentation.

(15)

The information processing device according to any one of (1) to (14), further comprising a setting unit that sets the important part based on a recognized user.

(16)

The information processing device according to (15), wherein the setting unit generates an individual model corresponding to each of the users.

(17)

The information processing device according to any one of (1) to (16), further comprising a display unit that displays the output position of the important part based on control by the output control unit.

(18)

The information processing device according to any one of (1) to (17), further comprising a voice output unit that outputs the spoken utterance based on control by the output control unit.

(19)

An information processing method, comprising controlling, by a processor, output of a spoken utterance related to information presentation, wherein the controlling further includes outputting the spoken utterance and visually displaying an output position of an important part of the spoken utterance.

(20)

A computer program for causing a computer to function as an information processing device comprising an output control unit that controls output of a spoken utterance related to information presentation, wherein the output control unit outputs the spoken utterance, and visually displays an output position of an important part of the spoken utterance.

REFERENCE SIGNS LIST 10 information processing terminal
110 display unit
120 voice output unit
130 voice input unit
140 imaging unit
150 sensor unit
160 control unit
170 server communication unit
20 information processing server
210 recognition unit
220 setting unit
230 output control unit
240 voice synthesis unit
250 storage unit
252 user DB
254 model DB
256 content DB
260 terminal communication unit

The invention claimed is:

1. An information processing device, comprising
a processor configured to:
control output of a spoken utterance related to information presentation,
estimate first information in the spoken utterance that has a priority greater than a threshold for a first user, wherein the first information is estimated based on one of a first individual model and a common model acquired for the first user;
output the spoken utterance and visual information related to the spoken utterance;
display a first output position of a first important part of the spoken utterance in the visual information, wherein the first important part is a section of the spoken utterance that includes the first information;
detect a reaction of the first user to at least one of the outputted spoken utterance and the outputted visual information; and
update, based on the detected reaction of the first user, the first individual model for the first user.

2. The information processing device according to claim 1, wherein the spoken utterance further includes:
a non-important part that includes second information that has a priority lower than the priority of the first information.

3. The information processing device according to claim 1, wherein the processor is further configured to display progress related to the output of the spoken utterance in association with the first output position of the first important part.

4. The information processing device according to claim 1, wherein the processor is further configured to display a second output position of a second important part based on a second individual model acquired for a second user.

5. The information processing device according to claim 4, wherein the processor is further configured to simultaneously display the first output position of the first important part and the second output position of the second important part based on the first individual model and the second individual model, respectively.

6. The information processing device according to claim 1, wherein the processor is further configured to recognize the first user based on at least one of a voice of the first user, a behavior of the first user, and an image of the first user.

7. The information processing device according to claim 1, wherein the acquired common model corresponds to an attribute of the first user.

8. The information processing device according to claim 1, wherein the processor is further configured to control reception of an operation input during the output of the spoken utterance.

9. The information processing device according to claim 8, wherein the processor is further configured to refuse reception of the operation input made by a second user before or during output of the first important part that corresponds to the first user.

10. The information processing device according to claim 8, wherein, based on a detection of the operation input made by a second user during output of the first important part that corresponds to the first user, the processor is further configured to control the reception of the operation input based on a degree of concentration of the first user.

11. The information processing device according to claim 8, wherein the processor is further configured to control the output of at least one of the spoken utterance and the visual information based on a detection of the operation input before or during output of the first important part.

12. The information processing device according to claim 8, wherein the operation input includes a barge-in utterance.

13. The information processing device according to claim 1, wherein the processor is further configured to generate the first individual model for the first user based on an utterance of the first user.

14. The information processing device according to claim 1, wherein the reaction of the first user includes at least one of an expression of the first user, a line of sight of the first user, a gesture of the first user, and a behavior of the first user.

15. The information processing device according to claim 1, wherein the processor is further configured to recognize the first user, and wherein the estimation of the first information is further based on the recognition of the first user.

16. The information processing device according to claim 1, wherein the processor is further configured to generate a plurality of individual models that correspond to a plurality of users, wherein the plurality of users includes the first user and a second user, and wherein the plurality of individual models incudes the first individual model for the first user and a second individual model for the second user.

17. The information processing device according to claim 1, further comprising a display device configured to display the first output position of the first important part based on the control by the processor.

18. The information processing device according to claim 1, further comprising a voice output device configured to output the spoken utterance based on the control by the processor.

19. An information processing method, comprising:
controlling, by a processor, output of a spoken utterance related to information presentation;
estimating, by the processor, first information in the spoken utterance that has a priority greater than a threshold for a first user, wherein the first information is estimated based on one of a first individual model and a common model acquired for the first user;
outputting, by the processor, the spoken utterance and visual information related to the spoken utterance;
displaying, by the processor, a first output position of a first important part of the spoken utterance in the visual information, wherein the first important part is a section of the spoken utterance that includes the first information;
detecting, by the processor, a reaction of the first user to at least one of the outputted spoken utterance and the outputted visual information; and
updating, by the processor, the first individual model for the first user based on the detected reaction of the first user.

20. A non-transitory computer readable medium having stored therein, computer executable instruction, which when executed by a computer causes the computer to function as an information processing device comprising a processor to execute operations, the operations comprising:
controlling output of a spoken utterance related to information presentation;
estimating first information in the spoken utterance that has a priority greater than a threshold for a first user, wherein the first information is estimated based on one of a first individual model and a common model acquired for the first user;
outputting the spoken utterance and visual information related to spoken utterance
displaying a first output position of a first important part of the spoken utterance in the visual information, wherein the first important part is a section of the spoken utterance that includes the first information;
detecting a reaction of the first user to at least one of the outputted spoken utterance and the outputted visual information; and
updating the first individual model for the first user based on the detected reaction of the first user.

* * * * *